United States Patent
Shang et al.

(10) Patent No.: US 9,380,081 B1
(45) Date of Patent: Jun. 28, 2016

(54) BIDIRECTIONAL NETWORK DATA REPLICATIONS

(71) Applicant: CA, Inc., Islandia, NY (US)

(72) Inventors: Guoxian Shang, Beijing (CN); Haiyang Zhang, Beijing (CN); Hector Wang, Beijing (CN); Raymond Huang, Beijing (CN); Alexey Shvechkov, Hopkinton, MA (US)

(73) Assignee: CA, Inc., Islandia, NY (US)

( * ) Notice: Subject to any disclaimer, the term of this patent is extended or adjusted under 35 U.S.C. 154(b) by 232 days.

(21) Appl. No.: 13/897,170

(22) Filed: May 17, 2013

(51) Int. Cl.
  *G06F 15/16* (2006.01)
  *H04L 29/06* (2006.01)

(52) U.S. Cl.
  CPC .................. *H04L 65/1069* (2013.01)

(58) Field of Classification Search
  CPC ........................ H04L 61/256; H04L 61/2567
  USPC ..................... 709/203, 227; 726/11
  See application file for complete search history.

(56) References Cited

U.S. PATENT DOCUMENTS

| | | | | |
|---|---|---|---|---|
| 5,944,823 A * | 8/1999 | Jade | .................. | H04L 29/06 726/15 |
| 7,386,610 B1 * | 6/2008 | Vekiarides | .......... | G06F 11/2071 709/213 |
| 7,558,862 B1 * | 7/2009 | Tyukasz | ................ | H04L 63/029 709/227 |
| 7,992,199 B1 * | 8/2011 | Winick | ............... | H04L 41/0806 709/225 |
| 8,139,572 B1 * | 3/2012 | Distler | .................... | H04L 45/04 370/389 |
| 2002/0099957 A1 * | 7/2002 | Kramer | ............... | H04L 63/0272 726/15 |
| 2003/0115328 A1 * | 6/2003 | Salminen | ............ | H04L 63/0236 709/225 |
| 2003/0120816 A1 * | 6/2003 | Berthaud | ............ | H04L 63/0218 709/248 |
| 2004/0054927 A1 * | 3/2004 | Leppanen | ........... | H04L 63/0263 726/11 |
| 2005/0198007 A1 * | 9/2005 | Ossman | .................. | G06F 17/30 |
| 2006/0195896 A1 * | 8/2006 | Fulp | .................... | H04L 63/0263 726/11 |
| 2007/0140159 A1 * | 6/2007 | Eronen | ................... | H04L 12/12 370/328 |
| 2007/0160063 A1 * | 7/2007 | Mynam | ................. | H04L 63/068 370/395.52 |
| 2007/0226788 A1 * | 9/2007 | Lee | ..................... | H04L 63/0236 726/11 |
| 2008/0289027 A1 * | 11/2008 | Yariv | .................. | H04L 63/0227 726/11 |
| 2010/0228867 A1 * | 9/2010 | Lam | .................... | H04L 63/0254 709/228 |

* cited by examiner

*Primary Examiner* — Duyen Doan
(74) *Attorney, Agent, or Firm* — Gilliam IP PLLC

(57) ABSTRACT

A system and method establishes bidirectional contact through firewall devices. A method includes establishing a first connection between a first device and a second device and storing a connection record on the second device. When the second device receives a request to connect with the first device, it identifies and searches for the connection record corresponding to the first device. When the second device finds the connection, the second device sends a request to establish a second connection from the second device to the first device. Upon receiving the request to establish a second connection, the first device verifies the request to establish the second connection and the lifetime of the first connection. Upon verification, the first device establishes the second connection between the first computing device and the second device.

20 Claims, 5 Drawing Sheets

BIDIRECTIONAL NETWORK DATA REPLICATIONS

BACKGROUND

Software and hardware recovery can include creating a copy of data. Data copying via a network can require network configuration. Secure transmission of data via a network can require creation of multiple, secure connections.

BRIEF SUMMARY

According to one aspect of the present disclosure, a method of bidirectional network data replication includes establishing a first connection between a first device and a second device and storing a connection record on the second device. When the second device receives a request to connect with the first device, it identifies and searches for the connection record corresponding to the first device. When the second device finds the connection, the second device sends a request to establish a second connection from the second device to the first device. Upon receiving the request to establish a second connection, the first device verifies the request to establish the second connection and the lifetime of the first connection. Upon verification, the first device establishes the second connection between the first computing device and the second device.

BRIEF DESCRIPTION OF THE DRAWINGS

Aspects of the present disclosure are illustrated by way of example and are not limited by the accompanying FIGS. with like references indicating like elements.

DETAILED DESCRIPTION

Software and hardware recovery (e.g., restoration) can include creating a copy (e.g., replication) of data. The data may include executable files (e.g., binary files), configuration files, or other data files. Software that enables data replication or high-availability (e.g., ARCServe RHA) can require frequent data replication, and frequent data replication can require a reliable connection between a replica server and a target server (e.g., server on customer site). However, connectivity cannot be assured in all environments, as firewalls or other network security measures can interfere with connectivity. For example, a customer may need to restore data from a server (e.g., remote server, an internet-based "cloud" server, or a local server) behind a firewall.

An advantage of one or more of the methods discussed herein can include avoiding a need to change a network configuration on a customer's site. Another advantage can include increased security. For example, because the NAT connections are built from target servers on customer's site, only authenticated servers on the public network can access the target servers through these connections, and is therefore more secure than configuring IP/port forwarding for target servers. Yet another advantage can include facilitating support for disaster recovery or backward data replication from the replica server or internet-based servers to the target servers on customer's site.

Figure 1:
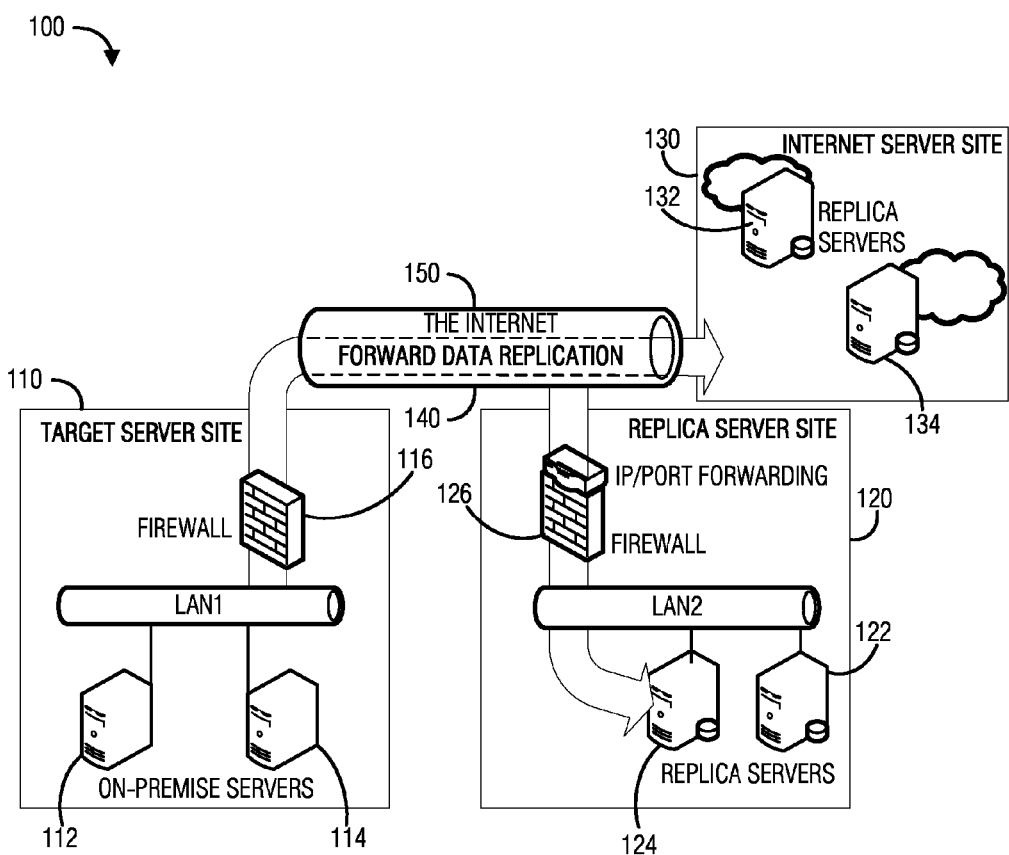
FIG. 1 illustrates forward data replication in a bidirectional data replication system.

FIG. 1 illustrates forward data replication in a bidirectional data replication system 100, according to an embodiment. The bidirectional data replication system can include a target server site 110, a replica server site 120, or an internet server site 130. A target server site 110 can include one or more on-premise servers 112 and 114. A replica server site 120 can include one or more replica site replica servers 122 and 124. An internet server site 130 can include one or more internet site replica servers 132 and 134.

Forward data replication 140 occurs when an on-premise server (e.g., on-premise server 112) can access a public network (e.g., the internet 150), and the on-premise server 112 creates a direct connection to the replica server site 120 or the internet server site 130. For example, on-premise server 114 can create a direct connection to replica server 134. A server site can include a firewall (e.g., target server site firewall 116 or replica server site firewall 126) or other mechanism to filter network traffic. For example, a server site can block all network connection ports except for hypertext transfer protocol (HTTP) ports, or a server site can block certain port numbers. To enable a connection through a network with blocked ports, the receiving network can be configured for port forwarding (e.g., routing traffic from one incoming port to a different internal port). Using port forwarding, a server site can receive data from a remote server and forward the data to a local server. For example, on-premise server 114 can create a connection to the replica server site 120, and the replica server site 120 can forward the data to replica server 124.

Figure 2:
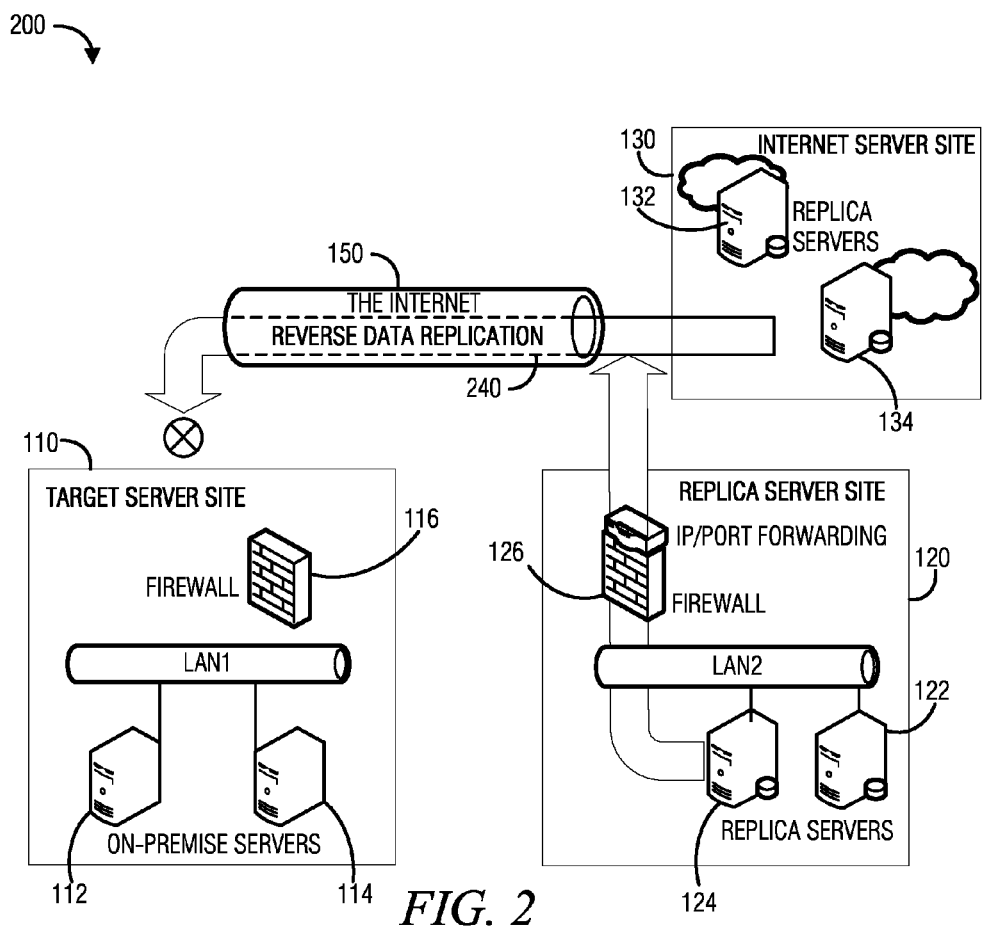
FIG. 2 illustrates target server site prevention of reverse data replication in a bidirectional data replication system.

FIG. 2 illustrates prevention of reverse data replication in a bidirectional data replication system 200, according to an embodiment. Prevention of reverse data replication 240 can occur when data is available for replication on the replica server site 120 or internet server site 130, but the replica server site 120 or internet server site 130 is unable to connect to the target server site 110. For example, replica server 124 may be able to access the internet 150 through a replica server site firewall 126 to create a request to begin reverse data replication 240, but the reverse data replication 240 may be blocked by a target server site firewall 116.

Figure 3:
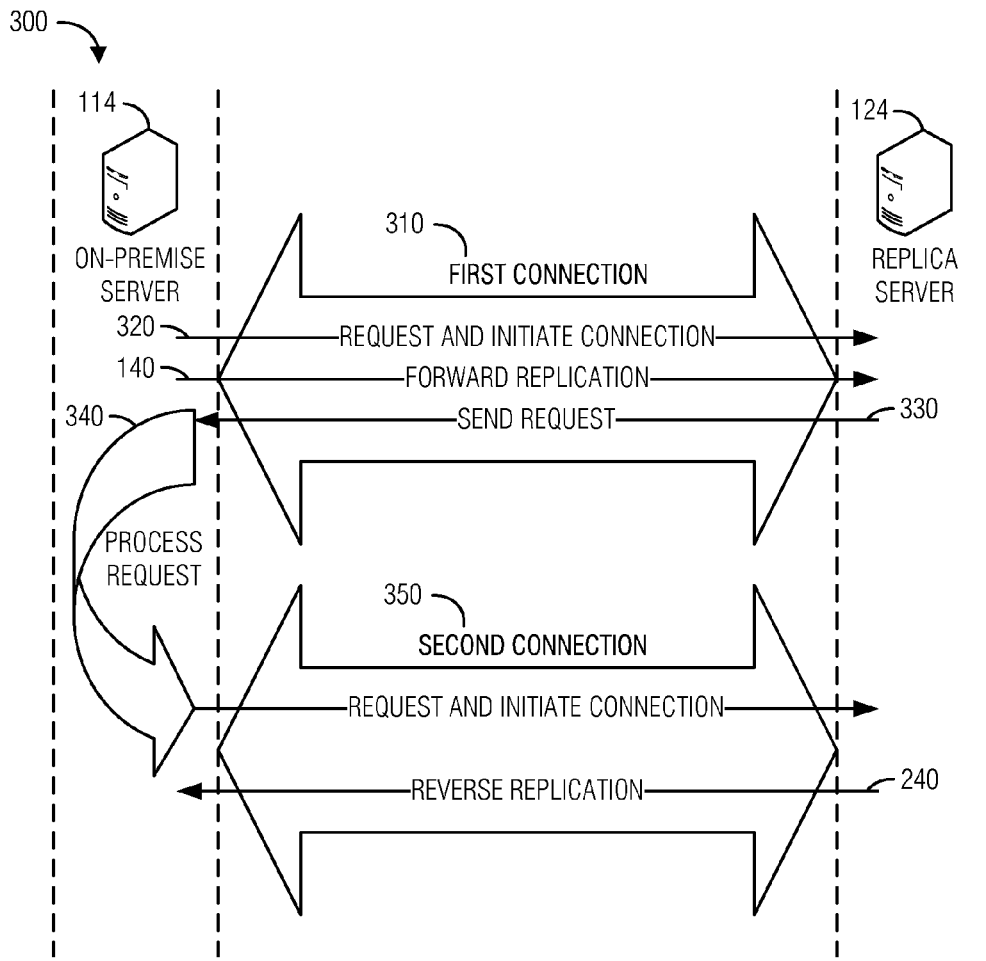
FIG. 3 illustrates an example first and second bidirectional network connection.

FIG. 3 illustrates an example first and second bidirectional network connection 300, according to an embodiment. To enable data replication, data must first be backed up from the target server site 110 to a replica server site 120 or to an internet server site. For example, a target server site on-premise server 114 can back up data to a replica server site replica server 124. During the backup phase, a first connection 310 can be made from the target server site 110 to a replica server site 120. The first connection 310 can use Transmission Control Protocol and Internet Protocol (TCP/IP). When a TCP/IP connection is created, the first connection TCP/IP connection information can be stored, and the bidirectional network connection 300 can use the stored TCP/IP connection information. The list of TCP/IP connection information can include a mapping of local connection parameters to remote connection parameters, which can be stored in a network address translation (NAT) table. As discussed above, port forwarding can be used to create one or more connections between the replica server site 120 and the target server site 110, but port forwarding can reduce network security. As an alternative to port forwarding, a second, bidirectional network connection can be made to connect the target server site 110 and the replica server site 120.

To create the first connection 310, the on-premise server 114 sends a request to initiate a connection 320 with the replica server 124. The first connection 310 can be encrypted. The first connection 310 can have an associated lifetime, after which the first connection 310 will end automatically. After the first connection 310 has been established, the on-premise server 114 can check the first connection 310 periodically to see if the lifetime has expired. If on-premise server 114 identifies that the lifetime of the first connection 310 has expired, the on-premise server 114 can use the first connection TCP/IP connection information stored in the NAT table to reestablish the first connection 310 with the replica server 124.

Once the first connection 310 is established, the on-premise server 114 begins forward replication 140 with the replica server 124. After the forward replication 140 has been completed, the replicated information is available at the replica server 124 for reverse replication (i.e., to be transferred back) to the on-premise server 114 or to a different server. The network configuration (e.g., firewalls) between the on-premise server 114 and the replica server 124 may prevent reverse replication initiated at the replica server 124. To enable reverse replication initiated at the replica server 124, a new connection can be created and used to transfer replicated information. A transfer of replicated information can be initiated on the replica server 124 by receiving a command from a requestor, where the requestor can be a user or an application on the replica server 124. A transfer of replicated information can be initiated on the replica server 124 by receiving a command to transfer replicated information from the on-premise server 114. Once a transfer of replicated information has been initiated, the replica server 124 can send a request to create a new connection 330 from the replica server 124 to the on-premise server 114. The on-premise server 114 can process the request and send a request to initiate a new connection 340, which can become the second connection 350. The second connection 350 can be encrypted. Once the replica server 124 and the on-premise server 114 establish this second connection 350, the reverse replication process 240 can begin. To improve security, the second connection 350 can be closed after the completion of the reverse replication 240.

Figure 4:
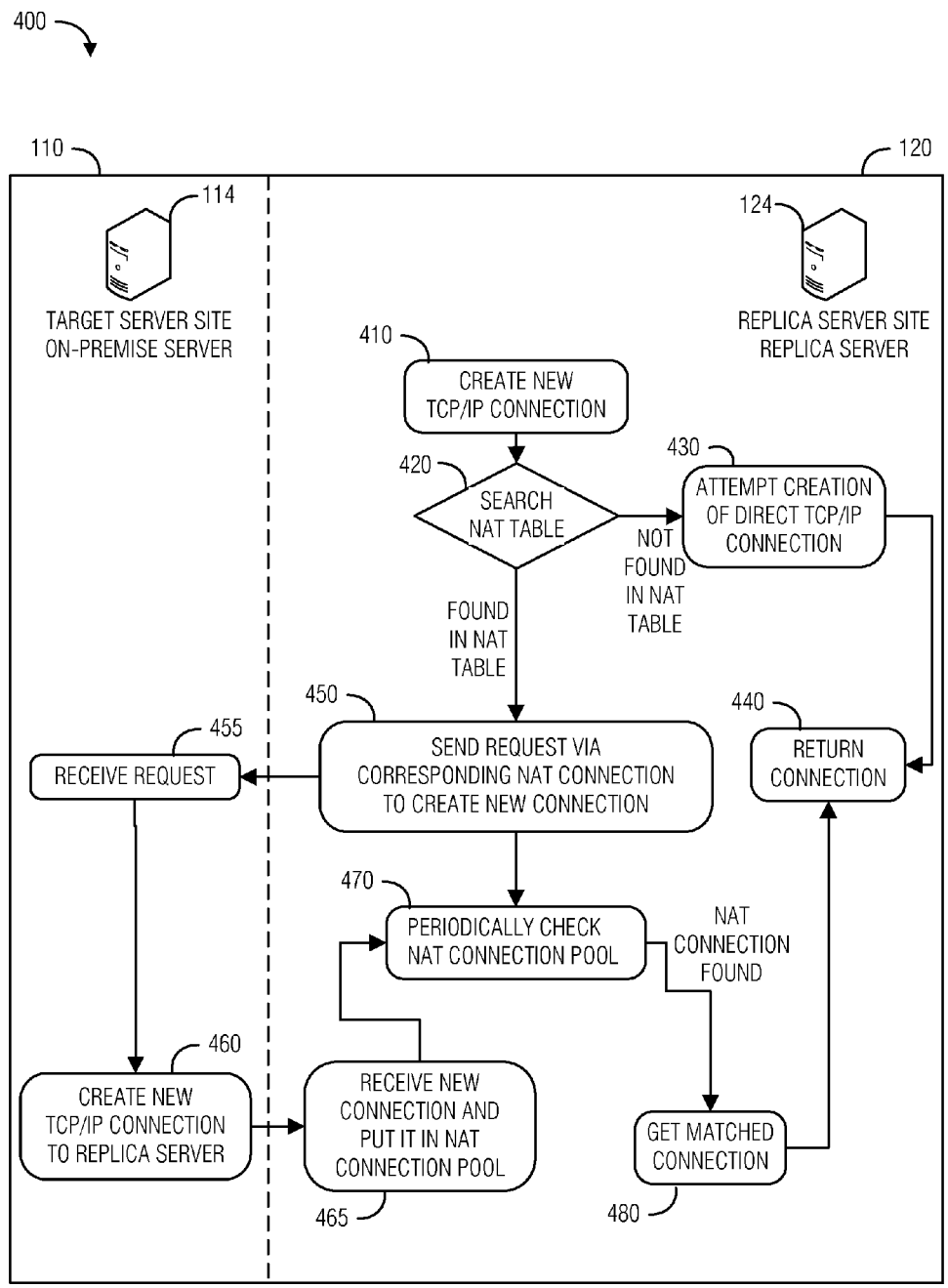
FIG. 4 illustrates an example flowchart for creating a bidirectional network connection.

FIG. 4 illustrates an example flowchart of searching for and creating a bidirectional network connection 400, according to an embodiment. A bidirectional network connection can be created to enable reverse replication, as discussed above. Creating a bidirectional network connection can include creating a new TCP/IP connection 410. When a data restoration event has been initiated, the replica server can search for the TCP/IP connection within the list of TCP/IP connections stored in the NAT table 420. If the TCP/IP connection is not found in the NAT table, then replica server can attempt to create a direct TCP/IP connection 430, and can return the connection information to the replication service 440. The new TCP/IP connection can be encrypted. The direct connection may fail, for example, due to a firewall preventing the connection. If the direct connection fails, the replication system will notify the user of the failed connection.

If the TCP/IP connection is found in the NAT table, then the replica server can send a request to create a new connection via the TCP/IP connection 450 to the target server. When the target server receives a new request 455, it can create the TCP/IP connection and send it to the replica server 460. When the replica server receives the TCP/IP connection, it can add the TCP/IP connection information to the NAT table 465. The replica server can periodically check the NAT table for a connection for the target server 470, and when the replica server can identify a connection for the target server in the NAT table, it can get the matched connection information 480, and return the connection information to the replication service 440.

Figure 5:
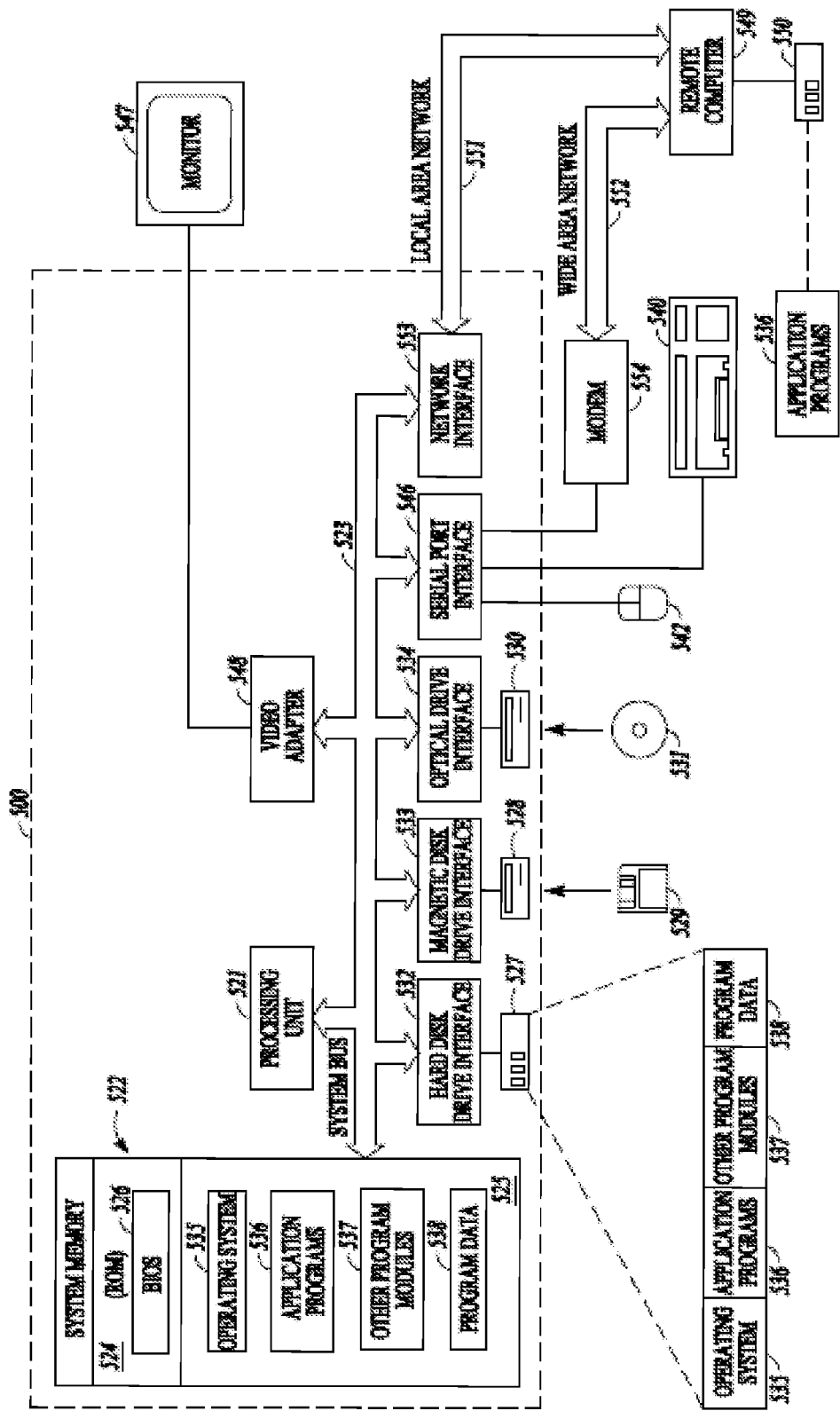
FIG. 5 illustrates an example of a computer system to implement techniques.

FIG. 5 shows a block diagram of an example of a computer system to implement various embodiments. In the embodiment shown in FIG. 5, a hardware and operating environment is provided that is applicable to any of the embodiments described. As shown in FIG. 5, the hardware and operating environment can include a general purpose computing device in the form of a computer 500 (e.g., a personal computer, workstation, or server), including one or more processing units 521, a system memory 522, or a system bus 523 that operatively couples various system components including the system memory 522 to the processing unit 521. There can be one or more one processing units 521, such that the processor of computer 500 comprises a single CPU, or a plurality of processing units, commonly referred to as a multiprocessor or parallel-processor environment. In one or more embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, can be stored in ROM 524. The computer 500 can further include a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 can couple with a hard disk drive interface 532, a magnetic disk drive interface 533, or an optical disk drive interface 534, respectively. The drives and their associated computer-readable media provide non-volatile storage of computer-readable instructions, data structures, program modules, and other data for the computer 500. Any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein can be resident on any one or number of these computer-readable media.

A user can enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 can operate in a networked environment using logical connections to one or more remote computers or servers, such as remote computer 549. These logical connections through a communication device coupled to or a part of the computer 500; not limited to a particular type of communications device. The remote computer 549 can be another computer, a server, a router, a network PC, a client, a peer device or other common network node, and typically includes many or all of the elements described above relative to the computer 500. The logical connections depicted in FIG. 5 can include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 can be connected to the LAN 551 through a network interface or adapter 553, which is one type of communications device. In one or more embodiments, when used in a WAN-networking environment, the computer 500 can include a modem 554 (another type of communications device) or any other type of communications device (e.g., a wireless transceiver), for establishing communications over the wide-area network 552, such as the internet. The modem 554, which can be internal or external, is connected to the system bus 523 via the serial port interface 546. In a networked environment, program modules depicted relative to the computer 500 can be stored in the remote memory storage device 550 of remote computer 549. The network connections shown are examples of network connections and other means of, and communications devices for, establishing a communications link between the computers can be used including hybrid fiber-coax connections, T1-T3 lines, DSL's, OC-3 and/or OC-12, TCP/IP, microwave, wireless application protocol, and any other electronic media through any suitable switches, routers, outlets and power lines.

As will be appreciated by one skilled in the art, aspects of the present disclosure can be illustrated and described herein in any of a number of patentable classes or context including any new and useful process, machine, manufacture, or composition of matter, or any new and useful improvement thereof. Accordingly, aspects of the present disclosure can be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media can be utilized. The computer readable media can be a computer readable signal medium or a computer readable storage medium. A computer readable storage medium can be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable signal medium can be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart(s) and block diagram(s) in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving, by a replica server, replicated data from an on-premise server having an on-premise firewall; and
performing a reverse data replication of the replicated data from the replica server back to the on-premise server, the reverse data replication comprising:
determining, by the replica server, whether there is a connection entry for a first connection in a connection table, wherein the first connection is between the on-premise server and the replica server;
in response to the connection entry being in the connection table, transmitting, by the replica server to the on-premise server, a connection request via the first connection, wherein the connection request comprises a request for the on-premise server to create a second connection between the on-premise server and the replica server, wherein the second connection is configured to use a parameter from the connection entry such that the replicated data bypasses the on-premise firewall; and
transmitting, by the replica server via the second connection, the replicated data to the on-premise server.

2. The method of claim 1, wherein the second connection is configured such that the replicated data bypasses the on-premise firewall without using port forwarding.

3. The method of claim 1, wherein said receiving replicated data from the on-premise server is performed via the first connection.

4. The method of claim 1, wherein the replica server includes a replica firewall.

5. The method of claim 1, wherein said receiving replicated data from the on-premise server is performed using port forwarding to bypass the replica firewall.

6. The method of claim 1, wherein the second connection is closed after completion of the reverse data replication.

7. The method of claim 1, wherein the first connection is terminated after a defined time, wherein performing the reverse data replication comprises performing the reverse data replication after the defined time.

8. The method of claim 1, wherein the connection table comprises a Network Address Translation (NAT) table, further comprising the replica server storing a parameter associated with the first connection in the NAT table.

9. The method of claim 1, wherein said determining whether there is a connection entry comprises determining that the NAT table includes an entry including the parameter which corresponds to the first connection.

10. One or more non-transitory machine-readable media having program code stored therein, to the program code comprising instructions to:
receive, by a replica server, replicated data from an on-premise server having an on-premise firewall; and
perform a reverse data replication of the replicated data from the replica server back to the on-premise server, wherein to perform the reverse data replication, the program code comprising instructions to:
determine, by the replica server, whether there is a connection entry for a first connection in a connection table, wherein the first connection is between the on-premise server and the replica server;
in response to the connection entry being in the connection table, transmit, by the replica server to the on-premise server, a connection request, wherein the connection request comprises a request for the on-premise server to create a second connection between the on-premise server and the replica server, wherein the second connection uses a parameter from the connection entry such that the replicated data bypasses the on-premise firewall; and transmit, by the replica server via the second connection, the replicated data to the on-premise server.

11. The one or more non-transitory machine-readable media of claim 10, wherein the second connection is configured such that the replicated data bypasses the on-premise firewall without using port forwarding.

12. The one or more non-transitory machine-readable media of claim 10, wherein to perform the reverse data replication, the program code comprising instructions to:

in response to the connection entry not being in the connection table, attempt, by the replica server, to create the second connection;

in response to successfully create the second connection, transmit, by the replica server via the second connection, the replicated data to the on-premise server; and in response to failing to create the second connection, provide notification of the failing to create the second connection.

13. The one or more non-transitory machine-readable media of claim 10, wherein the replica server includes a replica firewall, wherein the instructions to receive the replicated data from the on-premise server is performed using port forwarding to bypass the replica firewall.

14. An on-premise server comprising:

processor; and non-transitory machine-readable medium having program code executable by the processor to cause the on-premise server to:

perform a forward data replication of replicated data from an on-premise server to a replica server via a first connection, the on-premise server having an on-premise firewall;

create a second connection in response to a connection request from the replica server, wherein the connection request comprises a request for the on-premise server to create a second connection between the on-premise server and the replica server, wherein the second connection uses a parameter that is common to the first connection; and receive, from the replica server, the replicated data via the second connection that bypasses the on-premise firewall.

15. The on premise server of claim 14, wherein the second connection is configured such that the replicated data bypasses the on-premise firewall without using port forwarding.

16. The on-premise server of claim 14, wherein the program code comprises program code executable by the processor to cause the on-premise server to create the first connection having the parameter.

17. The on-premise server of claim 14, wherein the program code executable by the processor to cause the on-premise server to perform the forward data replication comprises program code executable by the processor to cause the on-premise server to port forward to bypass a replica firewall of the replica server.

18. The on-premise server of claim 17, wherein the program code executable by the processor comprises program code executable by the processor to cause the on-premise server to close the second connection after completion of receipt of the replicated data.

19. The on-premise server of claim 14, wherein the second connection is encrypted.

20. The on-premise server of claim 14, wherein the first connection is terminated after a defined time, wherein the program code executable by the processor to cause the on-premise server to create the second connection comprises program code executable by the processor to cause the on-premise server to create the second connection after the defined time.

* * * * *